United States Patent [19]

Miyata et al.

[11] 4,347,353
[45] Aug. 31, 1982

[54] METHOD FOR INHIBITING THE CORROSION-CAUSING TENDENCY AND COLORATION OF HALOGEN-CONTAINING OLEFIN RESIN BLENDS

[75] Inventors: Shigeo Miyata, Takamatsu; Masataka Kuroda, Kagawa, both of Japan

[73] Assignee: Kyowa Chemical Industry, Co., Ltd., Tokyo, Japan

[21] Appl. No.: 256,673

[22] Filed: Apr. 22, 1981

Related U.S. Application Data

[62] Division of Ser. No. 102,523, Dec. 11, 1979, Pat. No. 4,284,762.

[30] Foreign Application Priority Data

Dec. 14, 1978 [JP]  Japan .................... 53/153732

[51] Int. Cl.³ .............. C08K 3/22; C08K 5/09; C08K 5/42
[52] U.S. Cl. .................... 528/485; 528/486; 528/487; 528/488
[58] Field of Search ........... 525/240; 528/485, 486, 528/487, 488

[56] References Cited

U.S. PATENT DOCUMENTS 3,709,850  1/1973  Harrison ..................... 528/488
3,893,957  7/1975  Mixon ........................ 525/240

FOREIGN PATENT DOCUMENTS 1237320  3/1967  Fed. Rep. of Germany ...... 528/485
33-3541  5/1958  Japan ........................ 528/485
49-3947  1/1974  Japan ........................ 528/485
52-49528  4/1977  Japan ........................ 528/485
52-90192  7/1977  Japan ........................ 528/485
52-37487  9/1977  Japan ........................ 528/485
879304  10/1961  United Kingdom .............. 528/488

*Primary Examiner*—C. A. Henderson
*Attorney, Agent, or Firm*—Wenderoth, Lind & Ponack

[57] ABSTRACT

In a method for inhibiting the corrosion-causing tendency and coloration of an olefin polymer or copolymer containing a halogen component by incorporating about 0.01 to about 5 parts by weight of a hydrotalcite; the improvement which comprises mixing an olefin polymer or copolymer containing a halogen component attributed to a polymerization catalyst and/or to post-halogenation, with a hydrotalcite of the formula

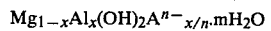

$$Mg_{1-x}Al_x(OH)_2A^{n-}{}_{x/n}\cdot mH_2O$$

wherein $0 < x \leq 0.5$, m is a positive number, and $A^{n-}$ represents an anion having a valence of n, or a product resulting from the surface-coating of said hydrotalcite with an anionic surface-active agent, said hydrotalcite having (i) a BET specific surface area of not more than 30 m²/g, preferably not more than 20 m²/g, (ii) an average secondary particle size of not more than 5 microns, preferably not more than 1.5 microns, and preferably (iii) a crystallite size, in the <003> direction determined by an X-ray diffraction method, of at least 600 Å, preferably at least 1000 Å.

5 Claims, No Drawings

METHOD FOR INHIBITING THE CORROSION-CAUSING TENDENCY AND COLORATION OF HALOGEN-CONTAINING OLEFIN RESIN BLENDS

This application is a division of Ser. No. 102,523, filed Dec. 11, 1979, now U.S. Pat. No. 4,284,762.

BACKGROUND OF INVENTION

This invention relates to an improved method for inhibiting the corrosion-causing tendency and coloration of olefin polymers or copolymers produced by using a Ziegler-type catalyst containing a halogen-containing compound as a catalyst ingredient and/or a carrier component, or olefin polymers or copolymers containing halogen components attributed to a polymerization catalyst and/or to post-halogenation, such as post-chlorinated olefin polymers or copolymers.

It is known that these halogen-containing olefin resins, because of their halogen component, cause corrosion or rust on metallic component parts such as molding machines or molds during the molding of the resins, or these resins or molded products prepared therefrom undergo coloration or deterioration.

The present invention pertains to an improved method for inhibiting the corrosion-causing tendency and coloration (or deterioration) of halogen-containing olefin polymers or copolymers (meant to include resin blends as well), which method avoids the aforesaid problems in a commercially advantageous manner by simple and inexpensive means with a good reproducibility using a small amount of a non-toxic inhibitor, and which is not likely to cause other new problems.

More specifically, the present invention provides, in a method for inhibiting the corrosion-causing tendency and coloration of an olefin polymer or copolymer containing a halogen component by incorporating about 0.01 to about 5 parts by weight of a hydrotalcite, the improvement which comprises mixing an olefin polymer or copolymer, containing a halogen component attributed to a polymerization catalyst and/or post-halogenation, with a hydrotalcite of the formula

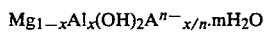

wherein $0<x\leq0.5$, m is a positive number and $A^{n-}$ represents an anion having a valence of n, or a product resulting from the surface-coating of said hydrotalcite with an anionic surface-active agent, said hydrotalcite having (i) a BET specific surface area of not more than 30 m²/g, preferably not more than 20 m²/g, and
(ii) an average secondary particle size of not more than 5 microns, preferably not more than 1.5 microns, and preferably (iii) a crystallite size, in the <003> direction determined by an X-ray diffraction method, of at least 600 Å, preferably at least 1000 Å.

In recent years, a number of new techniques have been developed for increasing the activity of halogen-containing Ziegler-type catalysts for the polymerization or copolymerization of olefins. This has consequently enabled omission of a step of decomposing and removing the catalyst after polymerization.

Since, however, the resulting olefin polymers or copolymers (to be sometimes referred to inclusively as olefin resins) still contain halogen components in an amount on the order of at least several hundred ppm, it has been desired to develop a technique which can effectively inhibit corrosion and coloration by an industrially simple and inexpensive means without adversely affecting the resulting olefin resins.

Previously, in an attempt to improve the surface properties of a molded article of an olefin resin such as dyeability, printability, coated film receptivity, or adhesion, there was suggested a composition comprising 100 parts by weight of a polyolefin and 0.5 to 300 parts by weight, preferably 20 to 60 parts by weight, of a complex metal hydroxide generically including hydrotalcites, or a product resulting from the removal of the water of crystallization therefrom (Japanese Pat. No. 37487/77). This Japanese patent discloses the improvement of the surface properties of polyolefin articles, but is quite silent on the corosion-causing tendency and coloration of olefin resins containing halogen components, and on the elimination of these troubles. The Japanese patent states that the effect of improving the surface properties intended is insufficient if the amount of the additive is not more than 3 parts by weight, especially not more than 0.5 part by weight, and recommends that for favorable results, the additive should be used in an amount of not less than 30 parts by weight per 100 parts by weight of the polyolefin. The Japanese patent neither discloses nor suggests that to avoid the corrosion-causing tendency and coloration, the BET specific surface area, average secondary particle size and crystallite size of hydrotalcites are critical.

It was suggested to incorporate a hydrotalcite having a BET specific surface area of not more than 30 m²/g into a thermoplastic resin so as to improve its fire retardancy (Japanese Laid-Open Patent Publication No. 90192/77). The publication discloses that fire retardancy can be achieved by using the hydrotalcite in an amount of about 50 to about 150 parts by weight per 100 parts by weight of the thermoplastic resin. In this suggestion, too, the hydrotalcite is utilized in order to achieve an effect quite different from that intended by the present invention, and is quite silent on the corrosion-causing tendency and coloration of olefin resins containing halogen components. This Japanese Laid-Open Patent Publication neither describes nor suggests the importance of using hydrotalcites of specified BET specific surface area, average secondary particle size and crystallite size for the elimination of the aforesaid corrosion and coloration.

Some suggestions have also been made about the inhibition of corrosion or rust formation on metallic materials by halogen-containing olefin resins.

For example, Japanese Pat. No. 3541/58 discloses that in order to inhibit the corrosion of metallic material by an olefin resin such as polyethylene containing a halogen component obtained by polymerization with a Ziegler catalyst, a corrosion-inhibiting amount of a basic inorganic compound of a metal of Group II of the periodic table is incorporated in the olefin resin. This Japanese Patent Publication exemplifies calcium, magnesium, strontium, barium and zinc (in the order of decreasing effect) as the aforesaid metal, and the use of their oxides and hydroxides is recommended. Examples of these compounds given in the Patent Publication include calcium oxide, magnesium oxide, barium oxide, zinc oxide, calcium hydroxide, strontium oxide, strontium hydroxide, and barium hydroxide, the calcium oxide and calcium hydroxide being shown to be especially preferred. This Patent Publication is totally silent on hydrotalcites, however. Furthermore, as shown in Comparative Examples 2 and 3 hereinbelow, the use of magnesium oxide or magnesium hydroxide leads to insufficient corrosion resistance and also to a new trouble of yellowing molded articles prepared from the resulting resin composition. Moreover, the surface of the molded articles becomes rough.

Japanese Laid-Open Patent Publication No. 3947/74 discloses the incorporation into a halogen-containing olefin resin of a small amount of a compound selected from the group consisting of sodium oxide, potassium oxide, magnesium oxide, calcium oxide, zinc oxide, aluminum oxide, sodium hydroxide, potassium hydroxide, magnesium hydroxide, calcium hydroxide, zinc hydroxide, aluminum hydroxide, sodium aluminate, and sodium silicate. Satisfactory corrosion inhibition, however, cannot be obtained by this method, and moreover, new troubles such as coloration and surface roughening of molded articles produced from the resulting resin composition are caused.

Japanese Laid-Open Patent Publication No. 49258/77 suggests a polyolefin composition comprising a polyolefin produced by using a Ziegler catalyst and at least 0.01% by weight of a complex compound of the general formula

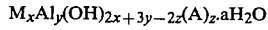

wherein M is Mg, Ca or Zn, A is $CO_3$ or $HPO_4$, and x, y, z and a are positive numbers,
which may embrace hydrotalcites, which composition is provided in an attempt to remove the defects of the aforsaid conventional methods for inhibiting corrosion that may be caused by halogen-containing olefin resins. This Japanese patent document points out the trouble of yellowing of polyolefin compositions caused by the prior art techniques disclosed in Japanese Patent Publication No. 3541/58 or Japanese Laid-Open Patent Publication No. 3947/74 cited hereinabove, and suggests the use of the compound expressed by the above general formula in order to impart good corrosion resistance while avoiding these troubles. It also points out that a conventional technique of utilizing an alkaline earth metal fatty acid salt causes a new problem of deteriorating the properties of a polyolefin itself if this compound is used in an amount sufficient to exhibit an anticorrosive effect of practical value.

Japanese Laid-Open Patent Publication No. 49258/77, however, only discloses the use of hydrotalcites that may be embraced within the general formula, and does not at all state the properties of hydrotalcite particles which should be used. It does not even have the slightest recognition about the possible effects of the properties of the hydrotalcite particles on the anticorrosive effect, coloration inhibiting effect, the appearance of molded articles and the reproducibility of these effects.

SUMMARY OF THE INVENTION

The present inventors have investigated the utilization of hydrotalcites for the inhibition of corrosion-causing tendency and coloration of olefin polymers or copolymers containing halogen components, and found that the properties of hydrotalcite particles have an important bearing on the effect of inhibiting corrosion-causing tendency and coloration by hydrotalcites and the reproducibility of this effect. Investigations of the present inventors have shown that the aforesaid inhibiting effect and its reproducibility are greatly affected by such factors as crystal aggregating property and crystallite sizes of the hydrotalcites used, and that these factors greatly affect the uniform dispersibility of hydrotalcites in the resulting composition, the flow of the composition during molding, the appearances of molded articles, and the reproducibility of these effects.

The present inventors noted that an improvement of practical value cannot be achieved unless many technical problems are solved, and furthered their investigations for the establishment of a set of new parameters which would lead to the solution of these problems.

These investigations led to the discovery that a set of new parameters consisting of (i) the BET specific surface area, determined by an $N_2$ adsorption method, of the hydrotalcite, and (ii) its average secondary particle size preferably in conjunction with (iii) its crystallite size in the <003> direction determined by an X-ray diffraction method, are essential to the securing of excellent corrosion resistance, excellent coloration inhibition, good appearance of molded articles and excellent reproducibility of these properties. On further investigations based on this discovery, they have found that the aforesaid effects and the reproducibility of these effects can be obtained when the hydrotalcite used meets a new set of parameters consisting of (i) a BET specific surface area of not more than 30 m²/g, preferably not more than 20 m²/g, especially not more than 15 m²/g, and (ii) an average secondary particle size of not more than 5 microns, preferably not more than 3 microns, especially not more than 1.5 microns, and preferably (iii) a crystallite size, in the <003> direction determined by an X-ray diffraction method of at least 600 Å, preferably at least 1000 Å.

Hydrotalcites generally available on the market have a crystallite size of as small as about 100 to about 300 A, a large crystal strain, a strong aggregating property (an average secondary particle size of at least about 10 microns, usually about 20 to about 70 microns), and a crystallite size in the <003> direction determined by an X-ray diffraction method of not more than 300 A, usually about 100 to about 300 A. The aforesaid improvement cannot be achieved with such hydrotalcites. It has been found that if any one of these parameters (i) and (ii) above is outside the range specified above, the resulting resin composition will lose its utilitarian value. For example, even when its resistance to coloration is good and its corrosive action is reduced, the reproducibility of these properties may be unsatisfactory, or the appearance of a molded article prepared from it and/or the reproducibility of this property is poor.

While an olefin resin composition containing a hydrotalcite usually available on the market cannot afford a practicable film, the use of a hydrotalcite which meets the aforesaid new parameters in accordance with this invention can provide an ultrathin film having a thickness of, for example, about 5 microns. When a usual commercially available hydrotalcite is incorporated into an olefin resin containing a halogen component such as post-chlorinated polyethylene, the hydrotalcite exerts a dechlorinating action on the polymer during molding at elevated temperatures or during heating, thereby accelerating the decomposition of the resin, or in an extreme case, causing blackening or foaming of the resin. This trouble, however, has been found to be avoided by utilizing hydrotalcites having the parameters specified in this invention.

It is an object of this invention therefore to provide a method for inhibiting the corrosion-inducing tendency or coloration of an olefin polymer or copolymer containing halogen components attributed to a polymerization catalyst and/or to post-halogenation, with a good reproducibility of the inhibiting effect and without causing troubles such as non-uniform dispersion of the hydrotalcite in the resin, the poor hot flowability of the resin composition during molding, and the aggrevated appearance of a molded article produced from the resulting resin composition.

The above and other objects and advantages of this invention will become apparent from the following description.

DETAILED DESCRIPTION OF INVENTION

The hydrotalcites used in this invention have (i) a BET specific surface area of not more than 30 $m^2/g$, preferably not more than 20 $m^2/g$, especially not more than 15 $m^2/g$. Such hydrotalcites have a fully grown crystallite size and a reduced crystal strain, and their aggregating property is extremely reduced. In the present invention, the use of such hydrotalcites having this parameter in combination with the parameter (ii) described above is essential. Thus, in addition to the BET specific surface area condition (i), the hydrotalcites used in this invention should have a secondary particle size of not more than 5 microns, preferably not more than 3 microns, especially not more than 1.5 microns. Preferably, the hydrotalcites ave a crystallite size in the <003> direction determined by an X-ray diffraction method of at least 600 Å, preferably at least 1000 Å.

The hydrotalcites used in this invention are expressed by the following formula

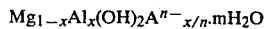

and satisfy a set of the parameters (i) and (ii), preferably in conjunction with (iii).

In the above formula, x is $0 < x \leq 0.5$, preferably $0.2 \leq x \leq 0.4$, $A^{n-}$ represents an anion having a valence of n, preferably a divalent anion such as $CO^{2-}{}_3$ or $SO^{2-}{}_4$, and m is a positive number, for example from 0.1 to 1.

The hydrotalcite particles having the parameters (i), (ii) and (iii) may be surface-treated with an anionic surface-active agent, and this frequently gives favorable results. In the surface treatment, the anionic surface-active agent is preferably used in an amount of about 1 to about 10% by weight, preferably about 1 to about 5% by weight, based on the weight of the hydrotalcite. For example, a powder of the hydrotalcite is added to an aqueous solution of an anionic surface-active agent such as sodium stearate with sufficient stirring. Or conversely, an aqueous solution of sodium stearate is added to a suspension of the hydrotalcite powder to cause chemical adsorption of the surface-active agent on the surface of the solid powder. When such a surface treatment is carried out, the dispersibility of the hydrotalcite is increased, and the flowability of the resin during molding is improved, thus contributing more to the improvement of the appearance of a molded article from the resin and the inhibition of its tendency to cause corrosion.

Examples of the anionic surface-active agents used include alkali metal salts of higher fatty acids of the formula RCOOM in which R is an alkyl group having 3 to 40 carbon atoms and M represents an alkali metal atom; allylsulfates of the formula $ROSO_3M$ in which R and M are as defined above; alkylsulfonates of the formula $RSO_3M$ in which R and M are as defined above; alkylarylsulfonates of the formula R-aryl-$SO_3M$ in which R and M are as defined above and the aryl group represents phenyl, naphthyl, tolyl, etc.; and sulfosuccinic ester salts expressed by the formula

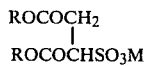

in which R and M are as defined above.

Specific examples of such surfactants include sodium stearate, potassium stearate, sodium oleate, potassium oleate, sodium palmitate, potassium palmitate, sodium laurate, potassium laurate, potassium behenate, sodium laurylbenzenesulfonate, potassium octadecylsulfate, sodium laurylsulfonate and disodium 2-sulfoethyl α-sulfostearate.

The olefin polymer or copolymer containing halogen components to which the method of this invention is applicable are olefin polymers or copolymers containing halogen components attributed to polymerization catalysts and/or to post-halogenation. Examples include homopolymers or copolymers of alpha-olefins such as polyethylene, polypropylene, poly(1-butene), poly(4-methyl-1-pentene), an ethylene-propylene copolymer, post-chlorinated polyethylene and analogs, copolymers of at least one alpha-olefin with dienes, post-chlorinated homopolymers or copolymers, and blends of these halogen-containing olefin resins.

In performing the method of this invention, the hydrotalcite meeting the parameters (i) and (ii), and preferably (iii) as well, is added in an amount of about 0.01 to about 5 parts by weight, preferably about 0.01 to about 2 parts by weight, more preferably about 0.05 to less than 0.5 part by weight, to the halogen-containing olefin resin described above.

There is no particular restriction on the means of mixing the hydrotalcite with the resin. For example, the same means as used conventionally in incorporating stabilizers or fillers into such resins may be utilized in this invention. For example, the mixing can be performed by using such devices as a ribbon blender, a high-speed mixer, a "Ko-kneader", a pelletizer, a mixing roll, an extruder or an intensive mixer.

In addition to the incorporation of the specified hydrotalcite, other additives used conventionally for olefin resins may be incorporated in the practice of the method of this invention. Examples of such additives are antioxidants such as 2,6-di-t-butyl-p-cresol, 2,5-di-t-butyl hydroquinone, 2,2'-methylenebis(4-methyl-6-t-butylphenol), 4,4'-thiobis-(6-t-butylphenol), 4,4'-thiobis-(6-t-butyl-m-cresol), and octadecyl-3-( 3',5'-di-t-butyl-4'-hydroxyphenyl) propionate; ultraviolet absorbers such as 2-hydroxy-4-octoxybenzophenone, 2-(2'-hydroxy-5-methylphenyl) benzotriazole and ethyl 2-cyano-3,3-diphenylacrylate; antistatic agents such as pentaerythritol monostearate, sorbitan monopalmitate, polyethylene oxide and carbowax; lubricants such as calcium stearate, zinc stearate, butyl stearate and ethylenebis stearamide; plasticizers such as dimethyl phthalate, diethyl phthalate, olefic acid esters, phosphoric acid esters, waxes, and liquid paraffin; coloring agents such as carbon black, phthalocyanine, quinacridone, indoline, azo pigments, titanium oxide and red iron oxide; and fillers such as asbestos, glass fibers, talc, mica, wallastonite, calcium silicate, aluminum silicate and calcium carbonate.

The amounts of these additives can be selected as desired. For example, the amounts based on the weight of the olefin resin are about 0.01 to about 1% for the antioxidants, about 0.01 to about 1% for the ultraviolet absorbers, about 0.01 to about 1% for the antistatic agents, about 0.1 to about 5% for the lubricants, about 0.1 to about 10% for the plasticizers, about 0.1 to about 5% for the coloring agents, and about 1 to about 50% for the fillers.

The hydrotalcites meeting the parameters (i) and (ii), and preferably in conjunction with (iii), can be produced by various methods. For example, they can be obtained by heat-treating in aqueous media the hydrotalcites obtained by the methods disclosed in Japanese Pat. Nos. 2280/71, 32198/72, 30039/75, 29477/73 and 29129/76, U.S. Pat. Nos. 3,539,306, 3,650,704 and 3,875,525, British Pat. Nos. 1,185,920, and West German Pat. No. 1592126.

According to one embodiment, the hydrotalcite in accordance with this invention is obtained by heat-treating a hydrotalcite obtained by any of the methods disclosed in the above-cited prior patent documents in an autoclave at a temperature of at least about 150° C., for example 150° to 250° C., for a period of about 5 to about 30 hours in an aqueous medium. The heat-treatment is performed under pressure until the hydrotalcite meets the parameters (i), (ii) and (iii), and higher temperatures are preferred. Temperatures above about 250° C. may be used, but this does not bring about any particular benefit. Thus, the use of temperatures within the above-specified range is suitable.

The following examples illustrate the present invention more specifically.

In the following examples, the corrosion resistance, yellowing resistance, the reproducibility of the effect of inhibiting yellowing, the appearance of molded articles and the reproducibility of the appearance, and the properties of hydrotalcite particles, were tested and evaluated by the following methods.

(1) CORROSION RESISTANCE TEST

A resin composition was prepared from 100 parts by weight of a polyolefin containing a halogen component, 0.4 to 0.8 part by weight of hydrotalcite, 0.1 part by weight of 2,2'-methylene-bis(4-methyl-6-t-butylphenol) and 0.1 part of dilauryl thiodipropionate, and pelletized at 260° C. A well-polished, degreased mild steel panel, 40×40 mm, was embedded in the pelletized resin composition, and heated at 200° C. for 30 minutes. After cooling, the mild steel panel was taken out of the resin composition, and placed in a desiccator adjusted to a relative humidity of about 93%, and allowed to stand at 60° C. for 20 hours. The degree of rust formation on the mild steel plate was then evaluated on a scale of classes 1 to 10 as follows: Class 4 and classes of lesser numbers mean that the resin composition has a practical effect of inhibiting corrosion. Class 3 and classes of lesser numbers are especially desirable.

Class 1: No change
Class 2: The area of rust accounts for less than 1% of the entire surface area.
Class 3: The area of rust accounts for at least 1% but less than 5% of the entire surface area.
Class 4: The area of rust accounts for at least 5% but less than 10% of the entire surface area.
Class 5: The area of rust accounts for at least 10% but less than 20%.
Class 6: The area of dust accounts for at least 20% but less than 30% of the entire surface area.
Class 7: The area of rust accounts for at least 30% but less than 50% of the entire surface area.
Class 8: The area of rust accounts for at least 50% but less than 70% of the entire surface area.
Class 9: The area of rust accounts for at least 70% but less than 90% by weight.
Class 10: Rust occurred on nearly the entire surface.

(2) YELLOWING RESISTANCE TEST

The resin pellets described in (1) above were press-formed into a sheet having a thickness of 3 cm, a length of 40 cm and a width of 40 cm at 230° C. The sheet was placed in a desiccator adjusted to a temperature of 70° C. and a relative humidity of 100%, and allowed to stand for 20 days. The reflectance of the sheet with light having a wavelength of 400 mμ to 700 mμ was measured by a spectro-photometer. From the reflectance $R_{400}$ and $R_{700}$ of light having a wavelength of 400 mμ and light having a wavelength of 700 mμ, the degree of yellowing resistance (Y%) was determined by the following equation. Smaller Y values show larger degrees of yellowing.

$$Y(\%) = \left(1 - \frac{R_{700} - R_{400}}{R_{700}}\right) \times 100$$

(3) TEST FOR THE REPRODUCIBILITY OF THE EFFECT OF INHIBITING YELLOWING

Ten samples were provided, and subjected to the yellowing resistance test described in (2) above. The reproducibility was rated by the difference between the highest yellowing resistance (the lowest yellowing) and the lowest yellowing resistance (the highest yellowing) in the ten samples tested.

| Class | Difference in yellowing resistance |
|-------|-----------------------------------|
| 1 | 0–1 |
| 2 | more than 1 to 3 |
| 3 | more than 3 to 5 |
| 4 | more than 5 to 7 |
| 5 | more than 7 |

Class 2 and class 1, especially class 1, are desired for practical purposes.

(4) TEST FOR THE APPEARANCE OF A MOLDED ARTICLE

A film having a thickness of about 30 microns was prepared by extrusion molding. The film was cut into pieces having a size of 20×15 cm. About 100 such films were stacked so that the difference in surface appearance could be viewed easily.

One hundred films prepared in the same way as above, except that the resin composition did not contain hydrotalcite as a corrosion inhibitor, were stacked. The first-mentioned 100 films were visually observed in comparison with the latter-mentioned 100 films, and were rated by the frequency of fish eye-like white spots. Classes 1 to 3 denote practical appearances.

Class 1: No difference from the standard product; very good appearance.
Class 2: Slightly inferior in appearance than the standard product. One to five fish eye-like marks existed in a 2×2 cm film when viewed under an optical microscope at a magnification of 150 X.
Class 3: Six to 20 fish eye-like marks existed.
Class 4: Twenty to 50 fish eye-like marks existed.
Class 5: Fifty to 100 fish eye-like marks existed.
Class 6: One hundred to 500 fish eye-like marks existed.
Class 7: More than 500 fish eye-like marks existed.

(5) TEST FOR THE REPRODUCIBILITY OF APPEARANCE

Ten sample films were provided and subjected to the same appearance test as described in (4) above. The reproducibility was rated on the following scale.
Class 1: At least 8 samples were rated as class 1, and the remainder, as class 2 in the appearance test.
Class 2: At least 7 samples were rated as class 2, and the remainder, as class 1 in the appearance test.
Class 3: At least 7 samples were rated as class 3, and the remainder as class 2 in the appearance test.
Class 4: At least 4 samples were rated as class 3 and the remainder as class 4 or 5 in the appearance test.
Class 5: None of the samples were rated as class 1, 2 or 3 in the appearance test.

For practical application, classes 3, 2 and 1, especially class 1, are desirable.

(6) BET SPECIFIC SURFACE AREA

Determined by the BET method utilizing $N_2$ gas adsorption.

(7) AVERAGE SECONDARY PARTICLE SIZE

About 0.5 to 1 mg of a sample was placed on a glass plate. An oil dispersant was added in the same amount, and kneaded. The mixture was uniformly diluted with a small amount of cyclohexanol. One drop of the dilution was placed on a slide glass. A cover glass was placed on it, and a pattern was formed by an optical microscope at a magnification of 400 X. The pattern was analyzed by a LUZEX 450 particle analyzer through a television camera.

(8) CRYSTALLITE SIZE

The half value width ($\beta$) was determined at $d_{003}=7.6$ A and $d_{006}=3.8$ A by the method described in Lectures in Experimental Chemistry [4], (Maruzen Co., Ltd.), 238 (1971). The crystallite size is obtained from the following equation.

$$\beta = \lambda \epsilon \cos \theta + 2\eta \tan \theta$$

wherein
$\lambda$ is the wavelength of the X-ray used,
$\epsilon$ is the crystallite size (A),
$\eta$ is the crystal lattice strain, and
$\theta$ is the Bragg's angle.

EXAMPLES 1 to 5 AND COMPARATIVE EXAMPLES 1 to 6

Each of the inhibitor compounds shown in Table 1 was mixed with polypropylene (containing 500 ppm of Cl) obtained by using a highly active Ziegler-type catalyst without performing an ash-removing treatment. The composition was pelletized at 260° C. in an extruder. The pellets were molded into a film having a thickness of about 5 microns using an extrusion molding machine. The pellets were tested for corrosion inhibiting ability, yellowing resistance and reproducibility of these properties. The films were tested for appearance and the reproducibility of the appearance.

The results are shown in Table 1.

TABLE 1

| Example (Ex.) and Comparative Example (CEx.) | Inhibitor compound type | BET specific surface area ($m^2/g$) | Average secondary particle size ($\mu$) | Crystallite size <003> (Å) | Amount (% by weight) |
|---|---|---|---|---|---|
| Ex. 1 | $Mg_{0.75}Al_{0.25}(OH)_2(CO_3)_{0.125} \cdot 0.63H_2O$ | 13 | 0.5 | 1160 | 0.4 |
| Ex. 2 | $Mg_{0.88}Al_{0.17}(OH)_2(CO_3)_{0.085} \cdot 0.47H_2O$ | 20 | 1.2 | 694 | 0.4 |
| Ex. 3 | $Mg_{0.70}Al_{0.30}(OH)_2(CO_3)_{0.15} \cdot 0.57H_2O$ | 7 | 0.3 | 1650 | 0.4 |
| Ex. 4 | $Mg_{0.06}Al_{0.40}(OH)_2(CO_3)_{0.2} \cdot 0.42H_2O$ | 12 | 0.4 | 1230 | 0.4 |
| Ex. 5 | $Mg_{0.70}Al_{0.30}(OH)_2(SO_4)_{0.15} \cdot 0.40H_2O$ | 18 | 1.4 | 620 | 0.4 |
| CEx. 1 | $Mg_{0.75}Al_{0.25}(OH)_2(CO_3)_{0.125} \cdot 0.50H_2O$ | 71 | 11.2 | 310 | 0.4 |
| CEx. 2 | $Mg_{0.75}Al_{0.25}(OH)_2(CO_3)_{0.125} \cdot 0.57H_2O$ | 25 | 7.0 | 650 | 0.4 |
| CEx. 3 | $Mg_{0.75}Al_{0.25}(OH)_2SO_4)_{0.125} \cdot 0.42H_2O$ | 32 | 3.2 | 420 | 0.4 |
| CEx. 4 | MgO | | | | 0.4 |
| CEx. 5 | $Mg(OH)_2$ | | | | 0.4 |
| CEx. 6 | Calcium stearate | | | | 0.4 |

| Example (Ex.) and Comparative Example (CEx.) | Corrosion resistance (class) | Yellowing resistance | | | Molded article | |
|---|---|---|---|---|---|---|
| | | Yellowing resistance degree Y (%) | Visual observation | Reproducibility (class) | Appearance (class) | Reproducibility (class) |
| Ex. 1 | 3 | 90 | White | 1 | 1 | 2 |
| Ex. 2 | 3 | 82 | " | 1 | 2 | 2 |
| Ex. 3 | 2 | 93 | " | 1 | 1 | 1 |

TABLE 1-continued

| | | | | | | |
|---|---|---|---|---|---|---|
| Ex. 4 | 3 | 91 | " | 1 | 2 | 2 |
| Ex. 5 | 3 | 91 | " | 1 | 3 | 3 |
| CEx. 1 | 4 | 75 | Pale yellow | 3 | 7 | 5 |
| CEx. 2 | 4 | 80 | " | 3 | 6 | 4 |
| CEx. 3 | 4 | 78 | " | 3 | 6 | 4 |
| CEx. 4 | 4 | 49 | Yellow | 4 | 6 | 5 |
| CEx. 5 | 5 | 43 | " | 3 | 6 | 5 |
| CEx. 6 | 6 | 78 | Pale yellow | 2 | 1 | 1 |

EXAMPLE 6

One kilogram of a powder of the same hydrotalcite as used in Example 1 was added to about 20 liters of water, and with fully strong stirring, the suspension was heated to about 60° C. A solution of 20 g of sodium oleate in 1 liter of warm water at about 60° C. was added, and the mixture was strongly stirred for about 30 minutes to coat the surface of the hydrotalcite crystals with sodium oleate. The product was collected by filtration, washed with warm water, dehydrated, and dried at about 100° C. for 10 hours. The dried product was pulverized, and the resulting powder was used as the corrosion inhibitor. Otherwise, the same treatment as in Example 1 was performed. The results are shown in Table 2.

EXAMPLE 7

One kilogram of a powder of the same hydrocalcite as used in Example 3 was added to about 20 liters of water, and with strong stirring, the suspension was heated to about 80° C. A solution of 30 g of sodium stearate in 1 liter of warm water at about 80° C. was added, and the mixture was stirred strongly for about 30 minutes. The product was collected by filtration, washed with warm water, dehydrated, and dried at about 120° C. for 10 hours. The dried product was pulverized, and the resulting powder was mixed in an amount of 0.3% with an ethylene-propylene copolymer (containing 300 ppm of Cl) obtained by using a highly active Ziegler-type catalyst without performing an ash-removing step. The mixture was molded into a film having a thickness of about 30 microns at about 250° C. by an extruder. The results are shown in Table 2.

EXAMPLE 8

The hydrotalcite coated with sodium oleate which was obtained by the method shown in Example 6 was mixed with high-density polyethylene (containing 100 ppm of Cl) obtained by using a highly active Ziegler-type catalyst without performing an ash-removing step. The mixture was pelletized at about 250° C. in an extruder, and the pellets were molded at about 250° C. by an injection molding machine. The results are shown in Table 2.

TABLE 2

| | | Inhibitor compound | | | | |
|---|---|---|---|---|---|---|
| Example | Type | Type of the surface-treating agent | BET specific surface area ($m^2/g$) | Average secondary particle size ($\mu$) | Crystallite size <003> (Å) | Amount (% by weight) |
| 6 | $Mg_{0.75}Al_{0.25}(OH)_2(CO_3)_{0.125} \cdot 0.63H_2O$ | Sodium oleate | 13 | 0.5 | 1160 | 0.4 |
| 7 | $Mg_{0.7}Al_{0.30}(OH)_2(CO_3)_{0.15} \cdot 0.57H_2O$ | Sodium stearate | 7 | 0.3 | 1650 | 0.2 |
| 8 | $Mg_{0.75}Al_{0.25}(OH)_2(CO_3)_{0.125} \cdot 0.63H_2O$ | Sodium oleate | 13 | 0.5 | 1160 | 0.1 |

| | | Yellowing resisance | | | Molded article | |
|---|---|---|---|---|---|---|
| Example | Corrosion resistance (class) | Yellowing resistance degrees Y (%) | Visual observation | Reproducibility (class) | Appearance (class) | Reproducibility (class) |
| 6 | 2 | 92 | White | 1 | 1 | 1 |
| 7 | 1 | 98 | " | 1 | 1 | 1 |
| 8 | 2 | 96 | " | 1 | 1 | 1 |

What we claimed is:

1. In a method for inhibiting the corrosion-causing tendency and coloration of a blend containing at least two members selected from the group consisting of polyethylene, polypropylene, poly(1-butene), poly(4-methyl-1-pentene), an ethylene-propylene copolymer, and a copolymer of at least one alpha-olefin with a diene, said blend containing a halogen component, by incorporating about 0.01 to about 5 parts by weight of a hydrotalcite in the halogen component-containing blend, the improvement which comprises mixing the blend, containing a halogen component attributed to a polymerization catalyst and/or to post-halogenation, with a hydrotalcite of the formula

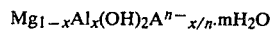

$$Mg_{1-x}Al_x(OH)_2A^{n-}{}_{x/n} \cdot mH_2O$$

wherein $0 < x \leq 0.5$, m is a positive number, and $A^{n-}$ represents an anion having a valence of n,
or with a product resulting from the surface-coating of said hydrotalcite with an anionic surface-active agent selected from the group consisting of an alkali metal salt of a fatty acid of the formula RCOOM in which R is an alkyl group having 3 to 40 carbon atoms and M represents an alkali metal atom, an alkali metal salt of an alkylsulfate of the formula $ROSO_3M$ in which R and M are as defined above, an alkali metal salt of an alkylsulfonate of the formula $RSO_3M$ in which R and M are as defined above, an alkali metal salt of an alkylarylsulfonate of the formula R-aryl-$SO_3M$ in which R and M are as defined above and aryl represents phenyl, naphthyl or tolyl, and an alkali metal salt of a sulfosuccinic ester of the formula

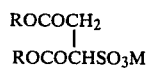

in which R and M are as defined above, said hydrotalcite having
 (i) a BET specific surface area of not more than 30 m²/g, and
 (ii) an average secondary particle size of not more than 3 microns.

2. The method of claim 1 wherein said hydrotalcite has a BET specific surface area of not more than 20 m²/g, and an average secondary particle size of not more than 1.5 microns.

3. The method of claim 1 wherein said hydrotalcite was (iii) a crystallite size, in the <003> direction determined by an X-ray diffraction method, of at least 600 Å.

4. The method of claim 2 wherein said hydrotalcite has (iii) a crystallite size, in the <003> direction determined by an X-ray diffraction method, of at least 1000 Å.

5. The method of claim 1 wherein the amount of said hydrotalcite is less than 0.5 part by weight per 100 parts by weight of the resin.

* * * * *